United States Patent
Pierce et al.

(10) Patent No.: US 12,507,831 B2
(45) Date of Patent: Dec. 30, 2025

(54) SYSTEMS FOR LOCATING A POWER TAKE-OFF COVER OF A STAND MIXER APPLIANCE

(71) Applicant: Haier US Appliance Solutions, Inc., Wilmington, DE (US)

(72) Inventors: Andrew Pierce, Louisville, KY (US); Matthew R. Hunter, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 484 days.

(21) Appl. No.: 18/093,174

(22) Filed: Jan. 4, 2023

(65) Prior Publication Data
US 2024/0215765 A1    Jul. 4, 2024

(51) Int. Cl.
*A47J 43/044* (2006.01)
*A47J 43/07* (2006.01)

(52) U.S. Cl.
CPC ......... *A47J 43/044* (2013.01); *A47J 43/0705* (2013.01); *A47J 2043/04454* (2013.01); *A47J 2043/0449* (2013.01)

(58) Field of Classification Search
CPC .................. A47J 43/044; A47J 43/0705; A47J 2043/04454; A47J 2043/0449
USPC ........................................................ 366/197
See application file for complete search history.

(56) References Cited

U.S. PATENT DOCUMENTS

| 1,774,509 | A | * | 9/1930 | Gould | A47J 43/08 74/371 |
| 2,187,272 | A | * | 1/1940 | Kochner | A47J 44/02 366/314 |
| 2,677,401 | A | * | 5/1954 | Schwaneke | A47J 43/082 403/18 |
| 4,277,181 | A | | 7/1981 | Stahly et al. | |
| 7,175,338 | B2 | | 2/2007 | Hooper et al. | |
| 2006/0198240 | A1 | * | 9/2006 | Short | A47J 43/0705 366/197 |
| 2014/0226436 | A1 | * | 8/2014 | Baker | H02K 7/003 310/75 R |
| 2024/0237857 | A1 | * | 7/2024 | Leung | A47J 43/0727 |

FOREIGN PATENT DOCUMENTS

AU    2014233605 A1    4/2015

* cited by examiner

*Primary Examiner* — David L Sorkin
(74) *Attorney, Agent, or Firm* — Dority & Manning, P.A.

(57) ABSTRACT

A stand mixer appliance includes a motor within a motor housing and a power take-off hub extending from a front portion of the motor housing. An insert includes at least one fastener hole with a fastener received within the at least one fastener hole and configured for securing the insert within the power take-off hub. The power take-off hub includes a cover rotatably coupled to the insert. The cover is adjustable between an open position and a closed position. The cover includes a magnet and a tab extending from an inner surface of the cover. The magnet is configured to engage with the fastener in the at least one fastener hole to selectively hold the cover in the closed position. The tab is configured to engage with a recess in the power take-off hub in the closed position.

19 Claims, 5 Drawing Sheets

SYSTEMS FOR LOCATING A POWER TAKE-OFF COVER OF A STAND MIXER APPLIANCE

FIELD OF THE INVENTION

The present subject matter relates generally to systems for covering the power take-off on stand mixer appliances, specifically regarding locating a cover over the power take-off.

BACKGROUND OF THE INVENTION

Stand mixers are generally used for performing automated mixing, churning, or kneading involved in food preparation. Typically, stand mixers include a motor configured to provide torque to one or more driveshafts. Users may connect various utensils to the one or more driveshafts, including whisks, spatulas, or the like. Some stand mixers include horizontal accessory outputs, or power take-offs (PTO). It is desirable for the manufacturer that the PTO is covered during operation of the stand mixer appliance, as to avoid unwanted debris or food materials from entering the body of the stand mixer. The PTO cover frequently includes the badge or brand identifier for stand mixers and is a highly visible component of the mixer. A PTO cover assembled with superior craftsmanship would be advantageous for brand appearance and product appeal.

BRIEF DESCRIPTION OF THE INVENTION

Aspects and advantages of the invention will be set forth in part in the following description, or may be apparent from the description, or may be learned through practice of the invention.

In one example embodiment, a stand mixer appliance includes a casing that comprises a base, a column mounted to the base, and a motor housing mounted to the column and extending outwardly above the base. The stand mixer appliance also includes a motor within the motor housing and a power take-off hub extending from a front portion of the motor housing. An insert includes at least one fastener hole with a fastener received within the at least one fastener hole and configured for securing the insert within the power take-off hub. The power take-off hub includes a cover rotatably coupled to the insert. The cover is adjustable between an open position and a closed position. The cover includes a magnet and a tab extending from an inner surface of the cover. The magnet is configured to engage with the fastener in the at least one fastener hole to selectively hold the cover in the closed position. The tab is configured to engage with a recess in the power take-off hub in the closed position.

In another example embodiment, a stand mixer appliance includes a casing that includes a base, a column mounted to the base, and a motor housing mounted to the column. The motor housing extends outwardly above the base. The stand mixer appliance also includes a motor within the motor housing, and a power take-off hub extending from a front portion of the motor housing. The power take-off hub includes at least one fastener hole with a fastener received within the at least one fastener hole and positioned within the power take-off hub, and a cover rotatably coupled to the power take-off hub. The cover is adjustable between an open position and a closed position. The cover includes a magnet and a tab extending from an inner surface of the cover. The magnet is configured to engage with the fastener in the at least one fastener hole to selectively hold the cover in the closed position. The tab is configured to engage with a recess in the power take-off hub in the closed position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
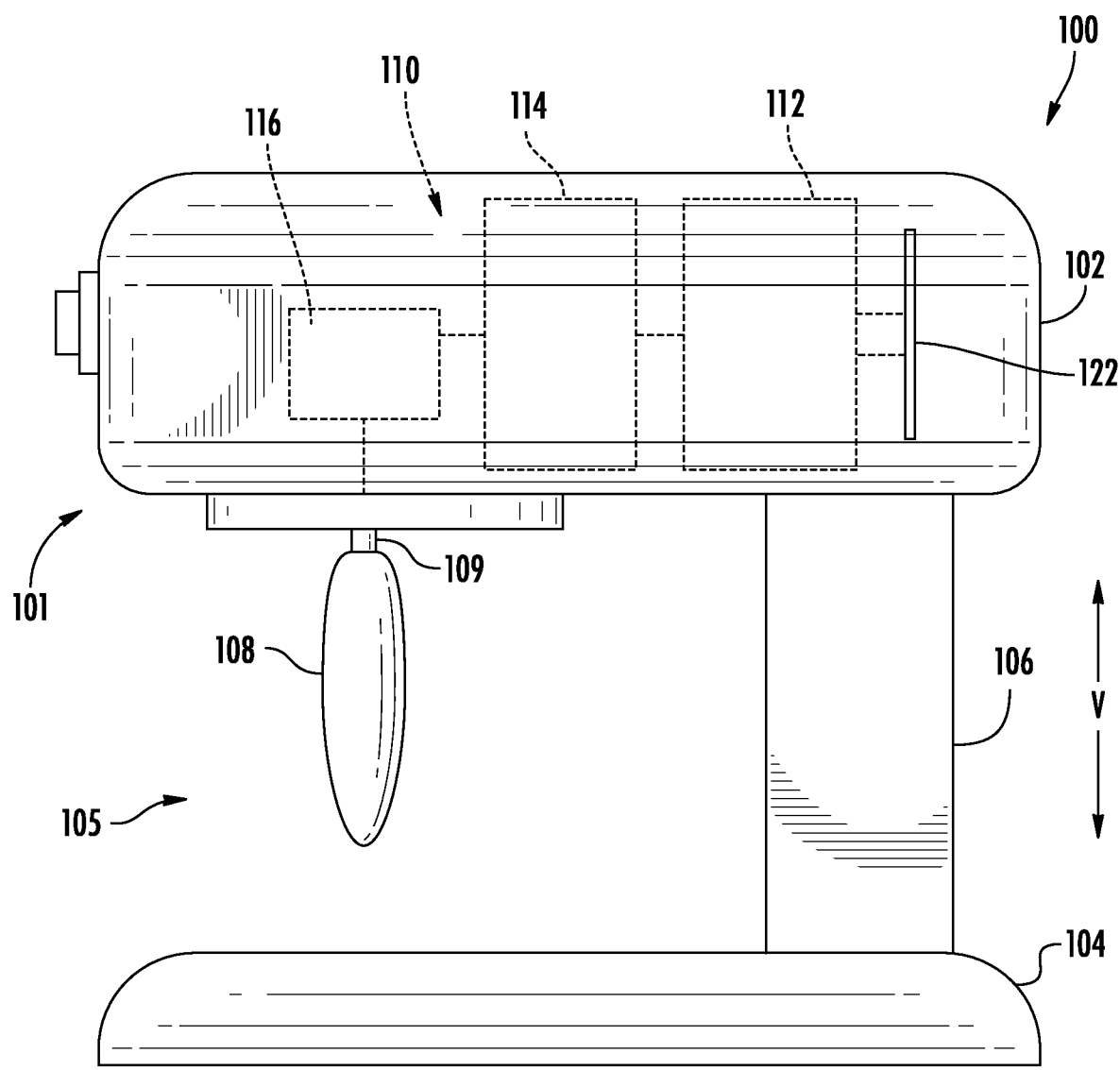
FIG. 1 provides a side section view of a stand mixer according to an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

FIG. 1 provides a side, elevation view of a stand mixer 100 according to an example embodiment of the present subject matter. It will be understood that stand mixer 100 is provided by way of example only and that the present subject matter may be used in or with any suitable stand mixer in alternative example embodiments. Moreover, stand mixer 100 of FIG. 1 defines a vertical direction V and a transverse direction T, which are perpendicular to each other. It should be understood that these directions are presented for example purposes only, and that relative positions and locations of certain aspects of stand mixer 100 may vary according to specific embodiments, spatial placement, or the like.

Stand mixer 100 may include a casing 101. In detail, casing 101 may include a motor housing 102, a base 104, and a column 106. Motor housing 102 may house various mechanical and/or electrical components of stand mixer 100, which will be described in further detail below. For example, as shown in FIG. 1, a motor 112, a planetary or reduction gearbox 114, and a bevel gearbox 116 may be disposed within motor housing 102. Base 104 may support motor housing 102. For example, motor housing 102 may be mounted (e.g., pivotally) to base 104 via column 106, e.g., that extends upwardly (e.g., along the vertical direction V) from base 104. Motor housing 102 may be suspended over a mixing zone 105, within which a mixing bowl may be disposed and/or mounted to base 104.

A drivetrain 110 may be provided within motor housing 102 and is configured for coupling motor 112 to a shaft 109 (e.g., a mixer shaft), such that shaft 109 is rotatable via motor 112 through drivetrain 110. Drivetrain 110 may include planetary gearbox 114, bevel gearbox 116, etc. An opening 132 for a horizontal accessory shaft 130 may align with the rotational axis of motor 112. Mixer shaft 109 may be positioned above mixing zone 105 on motor housing 102, and an attachment 108, such as a beater, whisk, or hook, may be removably mounted to mixer shaft 109. Attachment 108 may rotate within a bowl (not shown) in mixing zone 105 to beat, whisk, knead, etc. material within the bowl during operation of motor 112.

As noted above, motor 112 may be operable to rotate mixer shaft 109. Motor 112 may be a direct current (DC) motor in certain example embodiments. In alternative example embodiments, motor 112 may be an alternating current (AC) motor. Motor 112 may include a rotor and a stator. The stator may be mounted within motor housing 102 such that the stator is fixed relative to motor housing 102, and the rotor may be coupled to mixer shaft 109 via drivetrain 110. A current through windings within the stator may generate a magnetic field that induces rotation of the rotor, e.g., due to magnets or a magnetic field via coils on the stator. The rotor may rotate at a relatively high rotational velocity and relatively low torque. Thus, drivetrain 110 may be configured to provide a rotational speed reduction and mechanical advantage between motor 112 and mixer shaft 109.

Stand mixer 100 may include a controller 122 provided within casing 101. For example, controller 122 may be located within motor housing 102 of casing 101. Controller 122 may be a microcontroller, as would be understood, including one or more processing devices, memory devices, or controllers. Controller 122 may include a plurality of electrical components configured to permit operation of stand mixer 100 and various components therein (e.g., motor 112). For instance, controller 122 may be a printable circuit board (PCB), as would be well known.

As used herein, the terms "control board," "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 122 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 122 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

Figure 2:
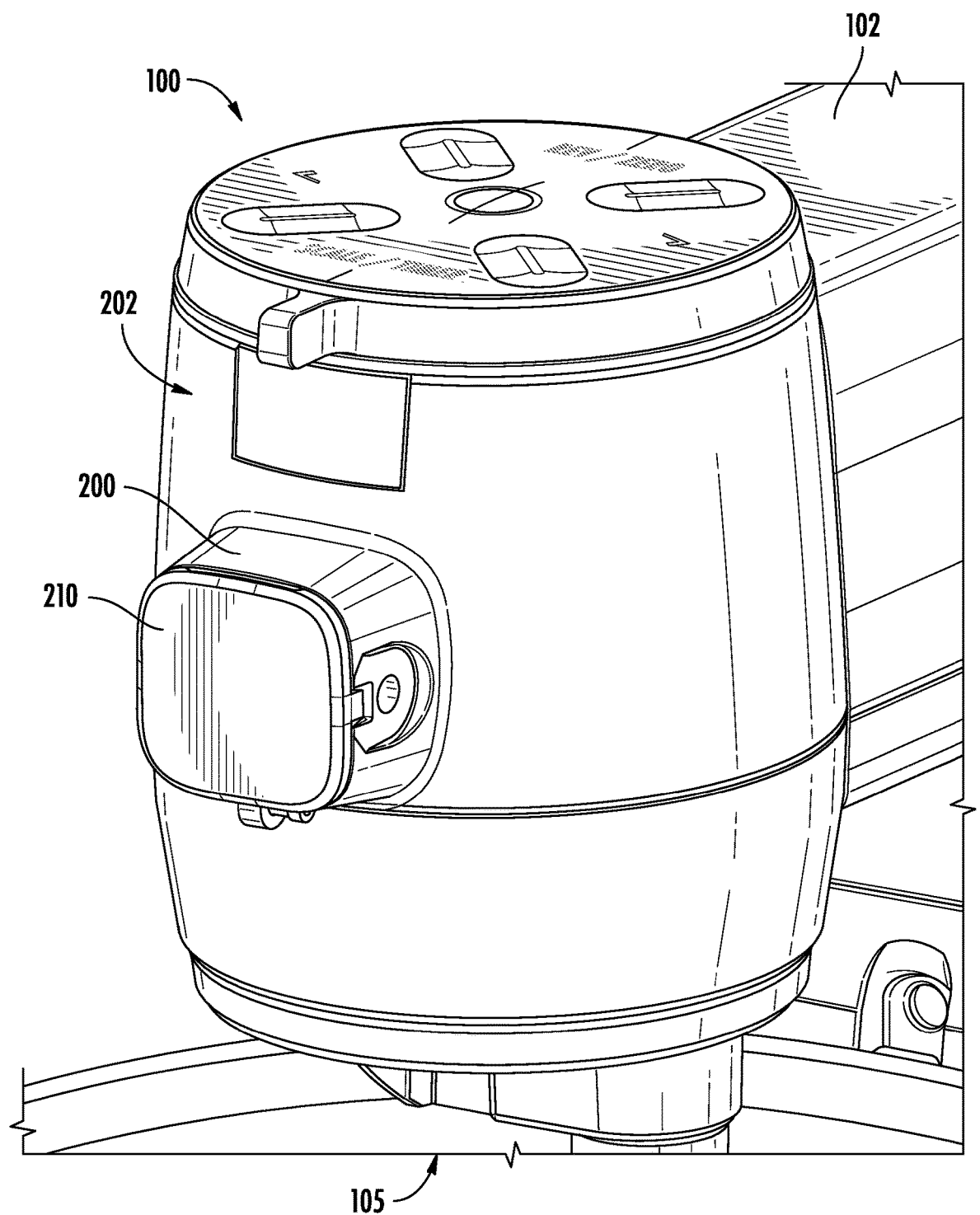
FIG. 2 provides a perspective view of a motor housing of the example stand mixer of FIG. 1.
Figure 3:
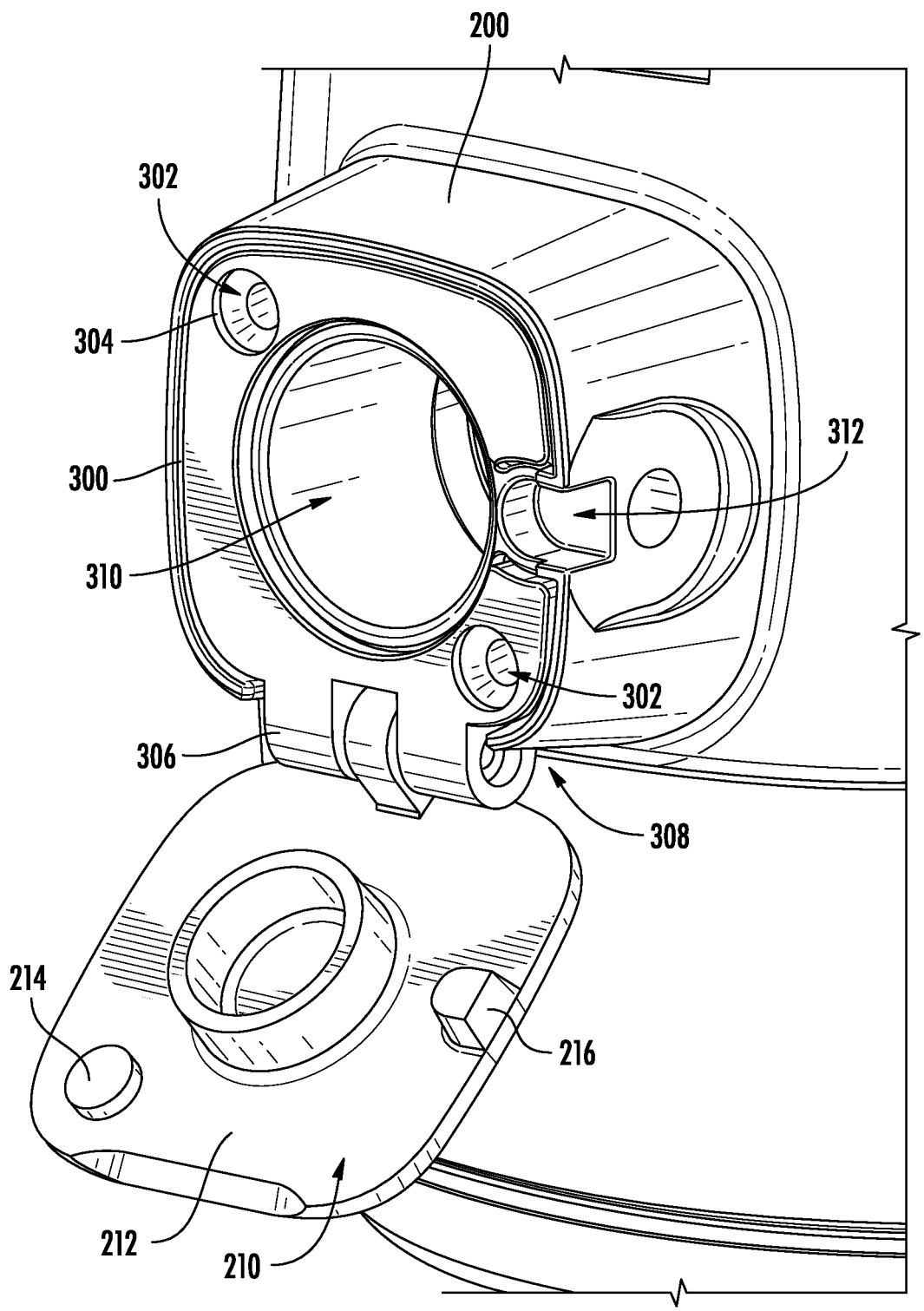
FIG. 3 provides a perspective view of a power take-off hub of the example a motor housing of FIG. 2.

Generally, FIGS. 2 and 3 illustrate power take-off hub 200 and components thereof. For example, FIG. 2 illustrates a perspective view of motor housing 102 of stand mixer 100. In general, a power take-off hub 200, shown in a closed position, may extend from a front portion 202 of motor housing 102. Power take-off hub 200 may include a cover 210 generally configured to prevent unwanted debris or food materials from entering the stand mixer 100. For example, FIG. 3 illustrates a perspective view of power take-off hub 200, with cover 210 in an open position. While cover 210 is in the open position, power take-off hub 200 may include an opening 310 generally configured for the receipt of horizontal accessories. In some example embodiments, cover 210 may generally be rotatably coupled to an insert 300 of power take-off hub 200. For example, cover 210 may couple to insert 300 at a hinge 306. Additionally or alternatively, hinge 306 may be positioned at a bottom portion 308 of power take-off hub 200.

As seen in FIG. 3, an inner surface 212 of cover 210 may include a magnet 214 and a tab 216. In general, magnet 214 may be configured to engage with insert 300 in order to hold cover 210 in the closed position. Additionally or alternatively, tab 216 may generally be configured to engage a recess 312 in power take-off hub 200. Generally, when cover 210 is in the closed position, cover 210 is locationally positioned on power take-off hub 200 via magnet 214 engaging insert 300 and tab 216 engaging recess 312. Cover 210 may be locationally positioned such that an exterior 220 (FIG. 5) of cover 210 is flush with power take-off hub 200. Magnet 214 and tab 216 will be described in further detail below.

Figure 4:
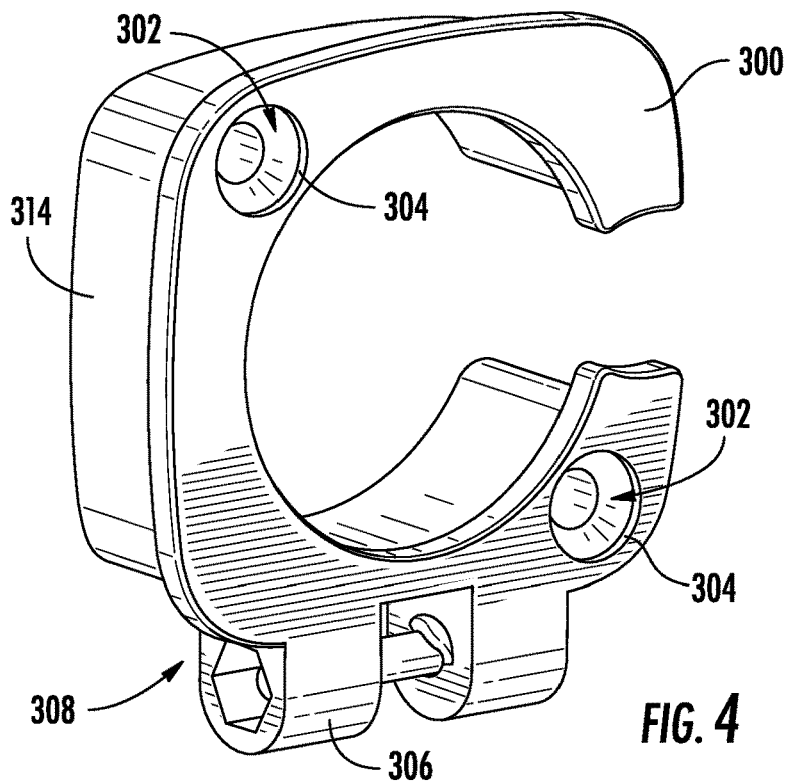
FIG. 4 provides a perspective view of an insert of the power take-off hub of FIG. 2 according to aspects of the present disclosure.
Figure 5:
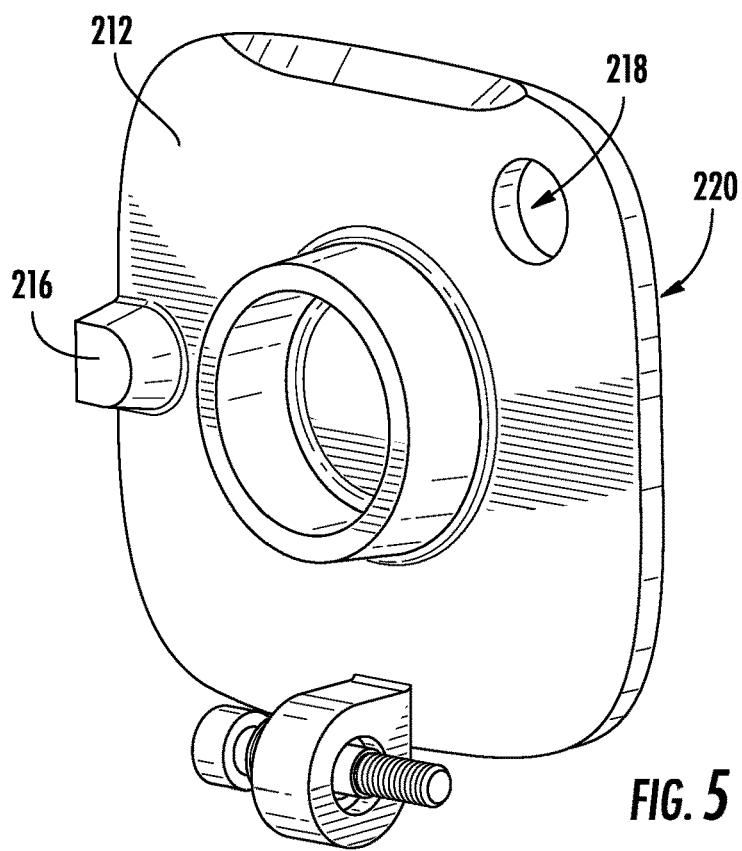
FIG. 5 provides a perspective view of a cover of the power take-off hub of FIG. 2 according to aspects of the present disclosure FIG. 6 provides a front, elevation view of the power take-off hub of the example a motor housing of FIG. 2.

Turning to FIGS. 4 and 5, illustrated is a perspective view of insert 300 (FIG. 4) and a perspective view of cover 210 (FIG. 5). As seen in FIG. 4, a back portion 314 of insert 300 may be press-fit into power take-off hub 200. Additionally or alternatively, insert 300 may include at least one (1) fastener hole 302 generally configured for securing insert 300 to power take-off hub 200. FIG. 4 illustrates an example embodiment with two (2) fastener holes 302. Fastener holes 302 may include one or more of a countersink and a fastener recess 304 such that a fastener, such as a screw, may be inset within insert 300. The fastener may extend through fastener holes 302, e.g., into power take-off hub 200, such that a head of the fastener is received within fastener recess 304. In alternative example embodiments, insert 300 may be excluded by including hinge 306 and the at least one fastener hole 302 directly on the power take-off hub 200. As may be seen in FIG. 5, cover 210 may include a slot 218 in inner surface 212 configured for the receipt of magnet 214 (FIG. 3). In some example embodiments, magnet 214 may be pressure fit into slot 218 or adhered to inner surface 212.

Figure 6:
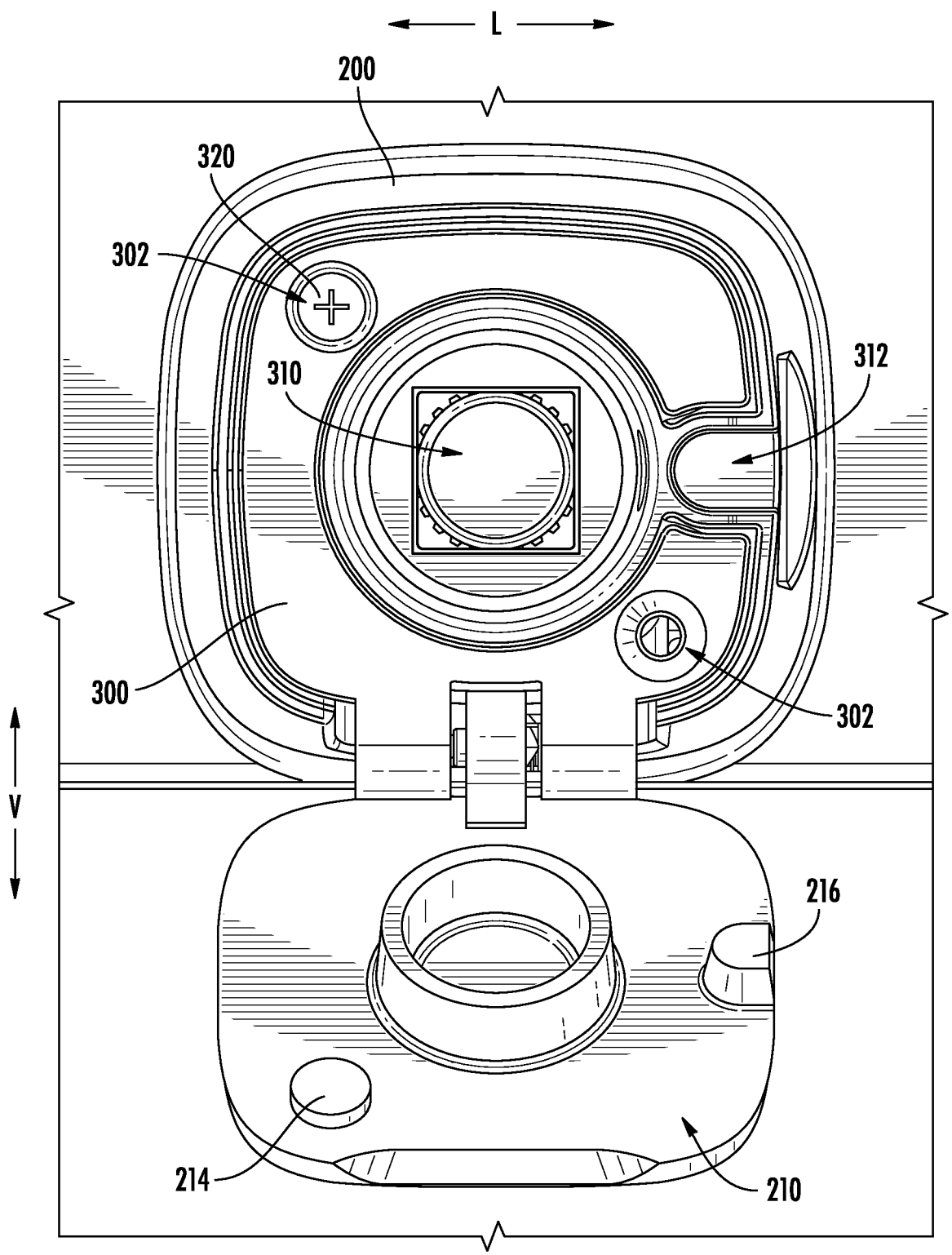

Turning now to FIG. 6, illustrated is front, elevation view of power take-off hub 200 with cover 210 in the open position. As seen from the above, when cover 210 is in the closed position, cover 210 is locationally positioned on power take-off hub 200 via magnet 214 and tab 216 engaging aspects of insert 300 and recess 312, respectively. For example, magnet 214 engaging with one or more of fastener recess 304 and a fastener 320 in one of the at least two fastener holes 302 which may restrain translation in a vertical and horizontal plane, extending along the vertical direction V and lateral direction L, respectively, of cover 210 relative to power take-off hub 200. Thus, magnet 214 engaging in fastener recess 304 acts as a four-way (4-way) locator preventing the translation of cover 210. Moreover, tab 216 of cover 210 engaging in recess 312 of power take-off hub 200 may restrain rotation in the vertical plane of cover 210 relative to power take-off hub 200. Thus tab 216 engaging recess 312 acts as a two-way (2-way) locator preventing rotation of cover 210.

As may be seen from the above, magnet 214 of cover 210 acting as a four-way (4-way) locator and tab 216 of cover 210 acting as a two-way (2-way) locator positively locate cover 210 in the closed position. Thus, provided may be a consistent system for maintaining the alignment or flush of cover 210 over power take-off hub 200. Additionally, magnet 214 permits the placement of hinge 306 at the bottom portion 308 of insert 300, which may hide hinge 306 from view during normal operation of stand mixer 100. Moreover, magnet 214 may maintain cover 210 shut during operation to reduce rattling noise for users. As such, using the combination of a four-way (4-way) locator and a two-way (2-way) locator ensures that when in the closed position, exterior 220 of cover 210 may be aligned with which cover 210 interfaces, e.g., with power take-off hub 200 and/or insert 300. Further, results of the proper alignment of cover 210 to power take-off hub 200 may be improved craftsmanship, increased performance, and reduced assembly problems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer appliance, comprising:
   a casing that comprises a base, a column mounted to the base, and a motor housing mounted to the column and extending outwardly above the base;
   a motor within the motor housing;
   a power take-off hub extending from a front portion of the motor housing; and
   an insert comprising at least one fastener hole with a fastener received within the at least one fastener hole and configured for securing the insert within the power take-off hub; and
   a cover rotatably coupled to the insert, the cover adjustable between an open position and a closed position, the cover comprising a magnet and a tab extending from an inner surface of the cover, the magnet configured to engage with the fastener in the at least one fastener hole to selectively hold the cover in the closed position and the tab configured to engage with a recess in the power take-off hub in the closed position.

2. The stand mixer appliance of claim 1, wherein the magnet is one of adhered or press-fit to the inner surface of the cover.

3. The stand mixer appliance of claim 1, wherein the at least one fastener hole is one or more of recessed and countersunk into the insert.

4. The stand mixer appliance of claim 1, further comprising a hinge at a bottom portion of the insert, the cover rotatably coupled to the insert at the hinge.

5. The stand mixer appliance of claim 1, wherein an exterior of the cover is flush with the power take-off hub when in the closed position.

6. The stand mixer appliance of claim 1, wherein the magnet engaging with the at least one fastener hole in the closed position restrains translation in a vertical and horizontal plane of the cover relative to the power take-off hub.

7. The stand mixer appliance of claim 1, wherein the tab of the cover in the recess of the power take-off hub restrains rotation in a vertical plane of the cover relative to the power takeoff hub.

8. The stand mixer appliance of claim 2, wherein the cover comprises a slot in the inner surface configured for receipt of the magnet, the magnet extending outwardly from the slot.

9. The stand mixer appliance of claim 3, wherein the magnet engages with a recessed portion of the at least one fastener hole.

10. The stand mixer appliance of claim 1, further comprising a second magnet configured to engage with another of the at least one fastener holes.

11. A stand mixer appliance, comprising:
    a casing that comprises a base, a column mounted to the base, and a motor housing mounted to the column and extending outwardly above the base;
    a motor within the motor housing;
    a power take-off hub extending from a front portion of the motor housing, the power take-off hub comprising at least one fastener hole with a fastener received within the at least one fastener hole and positioned within the power take-off hub; and
    a cover rotatably coupled to the power take-off hub, the cover adjustable between an open position and a closed position, the cover comprising a magnet and a tab extending from an inner surface of the cover, the magnet configured to engage with the fastener in the at least one fastener hole to selectively hold the cover in the closed position and the tab configured to engage with a recess in the power take-off hub.

12. The stand mixer appliance of claim 11, wherein the magnet is one of adhered or press-fit to the inner surface of the cover.

13. The stand mixer appliance of claim 11, wherein the at least one fastener hole is one or more of recessed and countersunk into the power take-off hub.

14. The stand mixer appliance of claim 11, further comprising a hinge at a bottom portion of the power take-off hub, the cover rotatably coupled to the power take-off hub at the hinge.

15. The stand mixer appliance of claim 11, wherein an exterior of the cover is flush with the power take-off hub when in the closed position.

16. The stand mixer appliance of claim 11, wherein the magnet engaging with the at least one fastener hole in the closed position restrains translation in a vertical and horizontal plane of the cover relative to the power takeoff hub.

17. The stand mixer appliance of claim 11, wherein the tab of the cover in the recess of the power take-off hub restrains rotation in a vertical plane of the cover relative to the power takeoff hub.

18. The stand mixer appliance of claim 12, wherein the cover comprises a slot in the inner surface configured for receipt of the magnet, the magnet extending outwardly from the slot.

19. The stand mixer appliance of claim 13, wherein the magnet engages with a recessed portion of the at least one fastener hole.

\* \* \* \* \*